Aug. 5, 1958
D. W. REYNOLDS
2,846,159
ROAD GUIDE
Filed Jan. 15, 1954
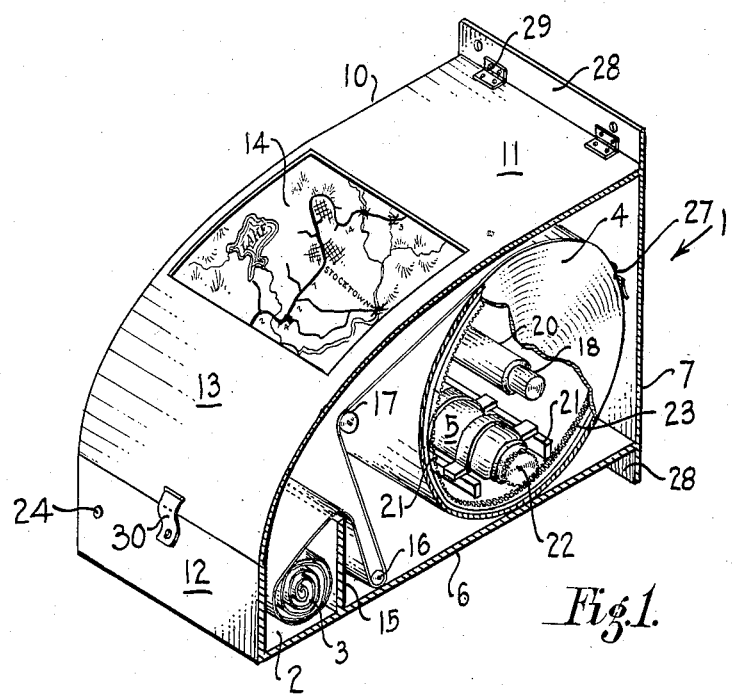
Fig.1.
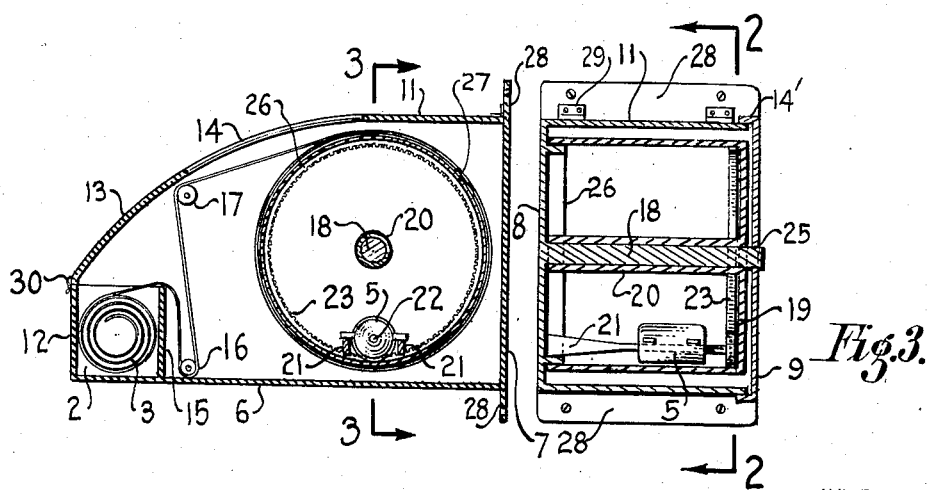
Fig.2.
Fig.3.
INVENTOR.
Dwight W. Reynolds
BY
A. Schapp
ATTORNEY

United States Patent Office 2,846,159
Patented Aug. 5, 1958

2,846,159
ROAD GUIDE
Dwight W. Reynolds, Pilot Hill, Calif.

Application January 15, 1954, Serial No. 404,198

2 Claims. (Cl. 242—67.1)

The present invention relates to improvements in a road guide for motor vehicles, and its principal object is to provide a convenient means for displaying a road map in the driver's view with controlled means for advancing the road map to correspond substantially to the advance of the vehicle.

It is further proposed to provide a road map of the character described in which the unused portion of the map is loosely supported in a pocket in the form of a roll, while the advance edge of the map is attached to a revolvable cylinder which draws successive portions of the map past a window through which they may be conveniently viewed by the driver of the vehicle.

It is additionally proposed to provide a motor drive for the cylinder, with the motor arranged inside of the cylinder for economy of space and compactness in construction.

Again, it is proposed to mount the cylinder in such a manner, with respect to the motor, that the cylinder may be readily removed, without disturbing the motor, for loading and unloading purposes.

And finally it is proposed to provide a road guide of the character described that is simple in construction, economic to manufacture, has relatively few parts and is always under the control of the driver, who may stop the advance of the map at any time if the map advances faster than the vehicle.

Further objects and advantages of my invention will appear as the specification proceeds, and the new and useful features of my road guide will be fully defined in the claims attached hereto.

The preferred form of my invention is illustrated in the accompanying drawing, forming part of this application, in which:

Figure 1 shows a perspective view of my road guide, with the near side wall omitted and portions broken away;

Figure 2, a longitudinal section through the road guide; taken along line 2—2 of Figure 3; and Figure 3, a transverse section taken along line 3—3 of Figure 2.

While I have shown only the preferred form of the invention, it should be understood that various changes or modifications may be made within the scope of the claims attached hereto, without departing from the spirit of the invention.

Referring to the drawing in detail, my road guide comprises in its principal features, a housing 1, a pocket 2 in the front portion of the housing for loosely holding a rolled map indicated at 3, a cylinder 4 mounted rearwardly of the pocket to occupy the major portion of the housing and having the free end of the map attached thereto, and a motor 5 for driving the cylinder.

The housing may be made in any suitable form and is here shown as comprising a flat bottom 6, a flat rear wall 7, flat and parallel side wall 8 and 9 and a top wall 10 contoured to present a horizontal rear portion 11, a vertical front portion 12 and a curved portion 13 connecting the portions 11 and 12 and formed with a window 14.

The side wall 8 is preferably fixed, while the side wall 9 is removably secured upon the housing, as by an all-around flange 14'. The width of the housing corresponds substantially to that of the road map to be used.

The pocket 2 for the rolled map is formed by a partition 15 rising from the bottom wall in spaced and parallel relation to the front wall and having a clear upper edge allowing the map to be drawn thereover. Suitable guide rollers 16 and 17 are located to guide the map toward the cylinder 4, with a substantial portion of the map displayed immediately below the window 14.

The cylinder 4 is slidably and revolvably mounted on a shaft 18 which latter projects sidewise from the wall 8 and corresponds in length to that of the cylinder. The latter has a closed outer end 19 and has an axial sleeve 20 projecting inwardly therefrom, the sleeve having a revolving fit with the shaft 18. The inner end of the cylinder is open, and the sleeve and the cylinder are of the same lengths and are dimensioned to come up against the face of the side member 8 when fully inserted.

The side wall 8 also has a pair of bars 21 projecting sidewise therefrom and into the cylinder, these bars carrying the motor 5 at a location below the shaft and near the closed end of the cylinder, the motor having a drive pinion 22 which meshes with a ring gear 23 mounted inside the cylinder near the closed end thereof.

The motor is operated by any suitable electric current, not shown, which latter may be rendered active and inactive by operation of conveniently located switch, as at 24.

The cylinder is relatively large, as compared with the pocket, and is made to occupy the major portion of the housing, having just enough room around the periphery thereof to accommodate the required number of convolutions of the map to take care of the entire length of the latter.

The shaft 18 may be made to project slightly beyond the closed end of the cylinder so as to find a bearing in the side wall 9, as at 25, and the side wall 8 may be formed with an annular flange 26, concentric with the shaft, to form a bearing for the inner end of the cylinder.

The free end of the map may be secured upon the outer face of the cylinder by means of suitable spring clips 27.

The housing is preferably secured upon the dash board or any other desired part of the vehicle by means of flanges 28.

If found desirable, the top 10 of the housing may be hinged, as at 29, to be held in place by a clasp 30.

In use, my road guide may be loaded from the side upon removal of the side wall 9. For this purpose, the cylinder is withdrawn to have the free end of the map secured thereto, whereupon the roll 3 and the cylinder may be inserted in a single motion, taking care to guide the intervening portion of the map around the rollers 16 and 17 in the manner shown.

The spent map may be removed by a reversal of the operation.

The speed of the motor and the gear ratio are preferably designed to advance the map to correspond substantially to the maximum speed of the vehicle. If the vehicle is operated at less speed, and the map gets ahead of the country through which the vehicle travels, its progress may be arrested by operation of the switch 24.

My road guide is principally intended for long trips, with a simple strip map covering the entire trip. In case of sidetrips or travelling around in cities, the switch is turned off until travel along the main highway is resumed.

The map to be used is preferably designed to give information not only of the geography of the country, but also on points of interest, dangers ahead and other data.

The map may also contain advertising matter. It might for instance, be furnished by an oil company, and have the various stations of that oil company along the highway, marked thereon.

I claim:

1. In a road guide including a guide strip for a motor vehicle, a housing having a flat side wall and having a shaft projecting perpendicularly from the latter, a hollow cylinder having an end wall and an axial sleeve attached to and projecting inwardly from the end wall through the full length of the cylinder and made to form an open-ended annular chamber therewith, the sleeve having a sliding fit on the shaft and being operable for moving toward the side wall for bringing the inner ends of the sleeve and the cylinder up against the side wall, with the open end of the chamber facing said wall, the sleeve being revolvable on the shaft, a motor within said chamber, means anchored to the side wall for supporting said motor, a driving connection between the motor and the cylinder, and means in the housing for guiding said guide strip upon the cylinder.

2. A structure as defined in claim 1, in which the side wall has an annular flange concentric with the shaft to serve as a bearing for the inner end of the cylinder.

References Cited in the file of this patent

UNITED STATES PATENTS

| | | |
|---|---|---|
| 1,418,162 | Pedersen | May 30, 1922 |
| 1,553,906 | Marette | Sept. 15, 1925 |
| 1,642,580 | Erb | Sept. 13, 1927 |
| 2,188,210 | Smith | Jan. 23, 1940 |
| 2,403,099 | Lear | July 2, 1946 |
| 2,482,475 | Gerber | Sept. 20, 1949 |
| 2,657,487 | Sprung | Nov. 3, 1953 |

FOREIGN PATENTS

| | | |
|---|---|---|
| 659,411 | Great Britain | Oct. 24, 1951 |